US008234204B2

(12) United States Patent
Blauvelt et al.

(10) Patent No.: US 8,234,204 B2
(45) Date of Patent: Jul. 31, 2012

(54) METHOD AND SYSTEM FOR MATCHING SHORT TRADING POSITIONS WITH LONG TRADING POSITIONS

(75) Inventors: Joseph P. Blauvelt, Nutley, NJ (US); Frank J. Curialle, Asbury, NJ (US)

(73) Assignee: Goldman, Sachs & Co., New York, NY (US)

( * ) Notice: Subject to any disclaimer, the term of this patent is extended or adjusted under 35 U.S.C. 154(b) by 2020 days.

(21) Appl. No.: 10/032,653

(22) Filed: Nov. 13, 2001

(65) Prior Publication Data
US 2002/0091625 A1 Jul. 11, 2002

Related U.S. Application Data

(60) Provisional application No. 60/248,133, filed on Nov. 13, 2000.

(51) Int. Cl.
*G06Q 40/00* (2006.01)
(52) U.S. Cl. ........... 705/37; 705/35; 705/36; 705/38; 705/39; 705/80
(58) Field of Classification Search ............ 705/35, 705/36, 37, 38, 39, 80
See application file for complete search history.

(56) References Cited

U.S. PATENT DOCUMENTS

| 5,692,233 A | 11/1997 | Garman |
| 5,802,499 A | 9/1998 | Sampson et al. |
| 5,806,048 A | 9/1998 | Kiron et al. |
| 5,812,988 A | 9/1998 | Sandretto |
| 5,819,237 A | 10/1998 | Garman |
| 5,819,238 A | 10/1998 | Fernholz |
| 5,845,265 A | 12/1998 | Woolston |
| 5,845,266 A | 12/1998 | Lupien et al. |
| 5,852,811 A | 12/1998 | Atkins |
| 5,884,286 A | 3/1999 | Daughtery, III |
| 5,893,078 A | 4/1999 | Paulson |
| 5,913,202 A | 6/1999 | Motoyama |
| 5,924,082 A | 7/1999 | Silverman et al. |
| 5,926,800 A | 7/1999 | Baronowski et al. |
| 5,940,810 A | 8/1999 | Traub et al. |
| 5,946,667 A | 8/1999 | Tull, Jr. et al. |
| 5,950,175 A | 9/1999 | Austin |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,780 A | 11/1999 | Watson |

(Continued)

FOREIGN PATENT DOCUMENTS

EP 000399850 A2 11/1990

OTHER PUBLICATIONS

Keyes, Jessica. "PAM for securities: For investment management"; Pension Management. Atlanta: Mar. 1996. vol. 32, Iss. 3. (4 pages).*

(Continued)

*Primary Examiner* — Nga B. Nguyen
(74) *Attorney, Agent, or Firm* — Perkins Coie LLP

(57) ABSTRACT

A system and method for automatically matching short and long positions of participants and automatically generating repurchase agreements ("repo") and reverse repurchase agreements ("reverse repo"). The system and method provide trading anonymity and various filtering options for the members.

21 Claims, 3 Drawing Sheets

U.S. PATENT DOCUMENTS

| | | |
|---|---|---|
| 6,012,042 A | 1/2000 | Black et al. |
| 6,012,046 A | 1/2000 | Lupien et al. |
| 6,016,482 A | 1/2000 | Molinari et al. |
| 6,016,483 A | 1/2000 | Rickard et al. |
| 6,018,721 A | 1/2000 | Aziz et al. |
| 6,018,722 A | 1/2000 | Ray et al. |
| 6,021,397 A | 2/2000 | Jones et al. |
| 6,021,398 A | 2/2000 | Ausubel |
| 6,026,383 A | 2/2000 | Ausubel |
| 6,058,379 A | 5/2000 | Odom et al. |
| 6,061,662 A | 5/2000 | Makivic |
| 6,076,072 A | 6/2000 | Libman |
| 6,078,903 A | 6/2000 | Kealhofer |
| 6,078,904 A | 6/2000 | Rebane |
| 6,085,176 A | 7/2000 | Woolston |
| 6,088,685 A | 7/2000 | Kiron et al. |
| 6,092,056 A | 7/2000 | Tull, Jr. et al. |
| 6,098,051 A | 8/2000 | Lupien et al. |
| 6,304,858 B1 | 10/2001 | Mosler et al. |
| 7,107,229 B1 * | 9/2006 | Sullivan .......................... 705/26 |
| 7,231,363 B1 * | 6/2007 | Hughes et al. .................. 705/37 |
| 7,454,378 B1 * | 11/2008 | White, Jr. ........................ 705/37 |
| 7,599,879 B2 * | 10/2009 | Louie et al. ..................... 705/37 |
| 2001/0037284 A1 | 11/2001 | Finkelstein et al. |
| 2002/0035531 A1 | 3/2002 | Push |
| 2002/0095362 A1 * | 7/2002 | Masand et al. .................. 705/35 |

OTHER PUBLICATIONS

PCT International Search Report, Mar. 26, 2003.

* cited by examiner

METHOD AND SYSTEM FOR MATCHING SHORT TRADING POSITIONS WITH LONG TRADING POSITIONS

This application claims priority to U.S. Provisional Patent application Ser. No. 60/248,133, which was filed Nov. 13, 2000, entitled Method And System For Providing An Efficient, Cost Efficient, Cost Effective Centralized Mechanism By Which A Dealer Looking To Cover Short Positions Will Find A Favorable Rate, the disclosure of which is incorporated herein by reference.

BACKGROUND OF THE INVENTION

Presently, a securities dealer seeking to cover short positions will individually contact other clients, dealers, brokers or securities lenders to do so. This process is generally time consuming, costly and at times inefficient. Furthermore, unless the dealer seeking to cover short positions contacts each and every broker, dealer or securities lender, there is no way to ensure that the dealer will find the security they need to cover a short position.

What is desired, therefore, is a method and system that will provide an efficient, cost effective centralized mechanism by which a dealer seeking to cover short positions will find available long positions at a favorable rate. These and other advantages are achieved by the invention described herein below.

SUMMARY OF THE INVENTION

In one embodiment, the invention provides a method and system for automatically identifying a counter party position that has a short or long position. The method comprises receiving at a first terminal at least two short positions. Also, receiving at the first terminal at least two long positions. Also, identifying at the first terminal a selected short position from the at least two short positions and a selected long position from the at least two long positions, the selected short position and the selected long position identified by parameters associated with the positions. Also, providing sufficient information from the first terminal to a second terminal and to a third terminal to allow a transaction between the selected short position and the selected long position.

DESCRIPTION OF THE DRAWINGS

The foregoing features and other aspects of the invention are explained in the following description taken in conjunction with the accompanying figures wherein.

It is understood that the figures are not limiting and are for illustration purposes only.

DETAILED DESCRIPTION

The various embodiments of the invention described below may be practiced by a small group of members, such as members of a group or consortium. The embodiments may also be practiced more generally by investors individually or through their broker, dealer, agents, in conjunction with a smaller member group.

To better understand the various embodiments of the invention, it is helpful to generally understand short and long positions within the context of securities and securities trading. A short position generally means that an investor has sold more of a particular asset or security than they own. A long position generally means that an investor owns more of a particular asset or security than they have sold. The asset or security might be an equity security, such as a stock, or it might be a debt security, such as a bond. Conceptually with a short position, the investor will eventually have to get the rest of the assets they sold, but don't currently own. Alternatively, if an investor has a long position in a particular asset or security, they may be willing to "lend" some of those securities to another investor who has a short position in the same security. Of course, lending generally implies some form of interest or compensation in return to the party owning the securities. In this way, the investor with a long position has an opportunity to earn a profit in the form of interest from their long position, and the investor with a short position has an opportunity to pay a known amount, in the form of interest, to reduce their borrowing costs by covering their short position.

As part of the process of covering a short position with a long position, it is common to use a repurchase agreement ("repo"). A repo is an agreement between two parties whereby one party sells a security to the other at a specified price and stated finance rate with a commitment to repurchase the security at a later date. The finance rate may be fixed or variable. The duration of the trade may be for 1 day (called an Overnight deal), or for a specified duration (called a term deal), or for an indeterminate time, but usually less than 1 year (which is called an Open deal). In essence, a repo is a secured loan. The party purchasing the security is making funds available to the seller and holds the security as a form of collateral.

"Reverse repo" is a term used to describe the other side of a repo transaction. The party selling and later repurchasing the security is said to perform a repo. The other party—one that purchases and later resells the security—is said to perform a reverse repo.

Figure 1:
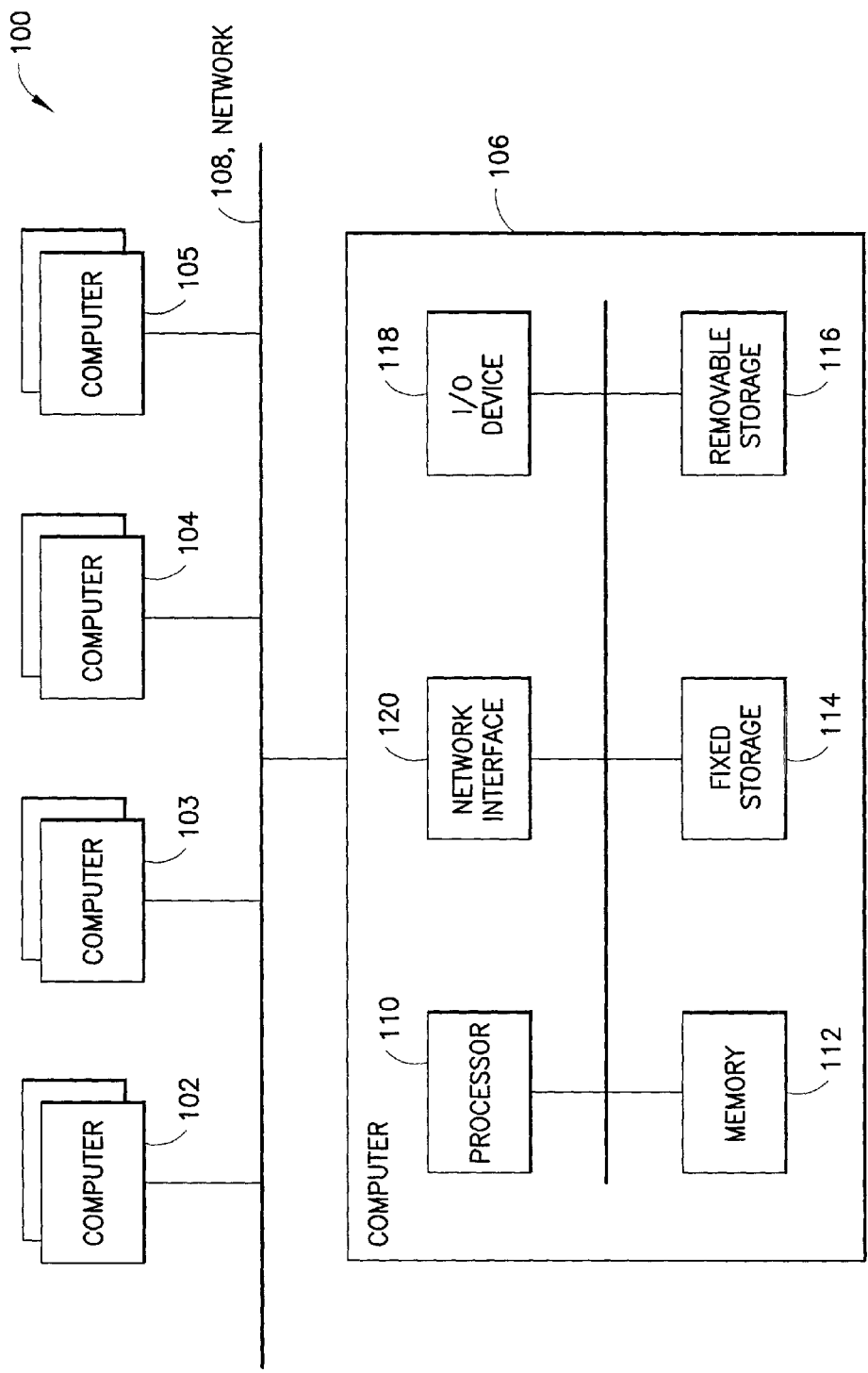
FIG. 1 illustrates an embodiment of a system that may be used with the invention.

Referring to FIG. 1, an embodiment of a system 100 used in the invention includes a number of computers or terminals 102, 103, 104, 105. Computers 102, 103, 104, 105 are interconnected to another computer 106 by a network 108. Computers 102, 103, 104, 105, 106 include at least one processor 110, memory 112, fixed and removable storage for data and/or code 114, 116, input/output devices 118 and network interface devices 120. Interconnection network 108 is the Internet, a direct connection, wired, wireless, infrared or other type of secure or unsecure data and information exchange.

For purposes of the description herein, the various embodiments of the method and system of the present invention may be referred to as "Position Billboard". Furthermore, to carry out the concepts of Position Billboard, there is described herein a third party or an entity "NewCo" that participates in or expedites various aspects of Position Billboard.

Generally in one embodiment, the invention is a securities short covering facility that allows members to cover their short positions at more attractive financing rates than current industry alternatives. In this embodiment, the invention systematically obtains long and short position information from each participant or member, processes the information in accordance with any system or member-controlled parameters, matches the short positions of participants with the long positions of other participants, and feeds the resultant activity back to each participant in the form of system-generated finance trades. NewCo acts as a third party agent, thus allowing the invention to provide anonymity among its participants.

The various embodiments of the invention provide a number of benefits. Some of those benefits are: reduced borrowing costs to participants through reduced fees; reduced margin requirements, thereby saving working capital for the borrower; attracting collateral by enabling participants to further reduce their borrow costs and/or earn incremental revenue for their non-tight lending; and creating balance sheet netting opportunities by booking both trades as Repos/Reverse Repos with a counter party, such as Government Securities Clearing Corporation ("GSCC").

GSCC is an industry service organization that serves to ensure orderly settlement in the government securities market. It should be understood that while the present description of the invention refers to GSCC and the United States securities market, this invention can be implemented for foreign securities markets as well that employ similar netting and counterparty risk criteria.

Other benefits of the embodiments of the invention are: increased liquidity in the lending market by having more collateral available for lending; maintaining the anonymity of participants by providing a third party agent; and creating sales force efficiencies enabling the sales force to focus on revenue generating opportunities.

As described above, an objective of some embodiments of the invention is to provide the NewCo members with a centralized mechanism to pool their long inventory for the purpose of covering short positions and generating the appropriate finance transactions to support those coverings. Finance trades generated by the various matching processes of the invention are done on an overnight basis at an agreed upon overnight financing rate.

In this manner, the various embodiments of the invention provide members with an efficient and less expensive "market" for short term financing. Without the invention, the majority of this activity is executed through inter-dealer brokers, dealer-to-dealer, and securities lenders. With the invention, participants and members of the NewCo entity save fees paid and margin costs on these transactions.

In order to maintain trading anonymity and facilitate settlement of on-side finance transactions, members of NewCo generally agree that the counterparty to their on-side transactions will be NewCo as agent. Members of NewCo also generally agree to partake in settlements through an Omnibus clearance account under the name of NewCo. This helps to assure that the members' and participants' long and short positions, hence their trading strategies, are kept anonymous throughout the settlement cycle. As in the securities lending market, members do have the right to inquire about the identity of the member on the other side of their trades.

NewCo members also have the ability to establish certain "filters" which have the effect of excluding some long or short positions. These filters can be by notional size (high, low or a range), security identifier (such as CUSIP number), security type, maturity range and other parameters, which are apparent to one of ordinary skill in the art. "CUSIP" stands for Committee on Uniform Securities Identification Procedures, and this committee supplies a unique nine-character identification, called the CUSIP number, for each security approved for trading in the U.S., to facilitate clearing and settlement. The filters can also be modified intra-day and any subsequent position refreshes would be applied to the revised filters. In one embodiment of the invention, the maintenance of filtering parameters is the responsibility of each member, thus insuring that only desired positions are downloaded.

Once the filters have been established, each member downloads their long and short positions, as well as their term repo and reverse repo transactions. Based upon members' parameters and agreed upon processing rules, the invention first attempts to cover a participant or member's short positions by substituting collateral that is out on term and open repo (with other members). NewCo keeps track of original start of day positions it has received from its members, as well as positions that result from the substitution transactions.

After all substitutions have occurred, the process matches the remaining short positions with the long positions of other members and generates the appropriate repo/reverse transactions. An overnight repo transaction is generated for the member with the long position, and an overnight reverse repo is generated for the member with the short position, each with the agreed upon overnight interest rate. In the event the total long position is greater than the total short position for a given CUSIP number, the lending occurs on a pro-rata basis. Similarly, when the total short position is greater than the total long position for a given CUSIP number, the borrowing occurs on a pro-rata basis.

Both the substitution and borrow/loan trades feed to the respective member's proprietary systems for position updating and settlement processing. The counterpart to each trade is the NewCo entity, and each member delivers/receives securities to/from a NewCo Omnibus account. NewCo keeps track of original start of day positions it has received from its members, as well as positions that result from short covering transactions.

Members have on-line inquiry capability to view only their own filters, restrictions, substitutions, downloaded start of day positions, positions excluded from the start of day download, executed trades and current positions. This information is also available in electronic form to facilitate reconcilliations. Members are not able to see the data of other participants.

In one embodiment, the matching process runs once per day. In other embodiments, more than one batch per day is run. The invention also obtains vendor prices, which are used for calculating the market value on (substitution and) borrow/loan transactions.

Figure 2:
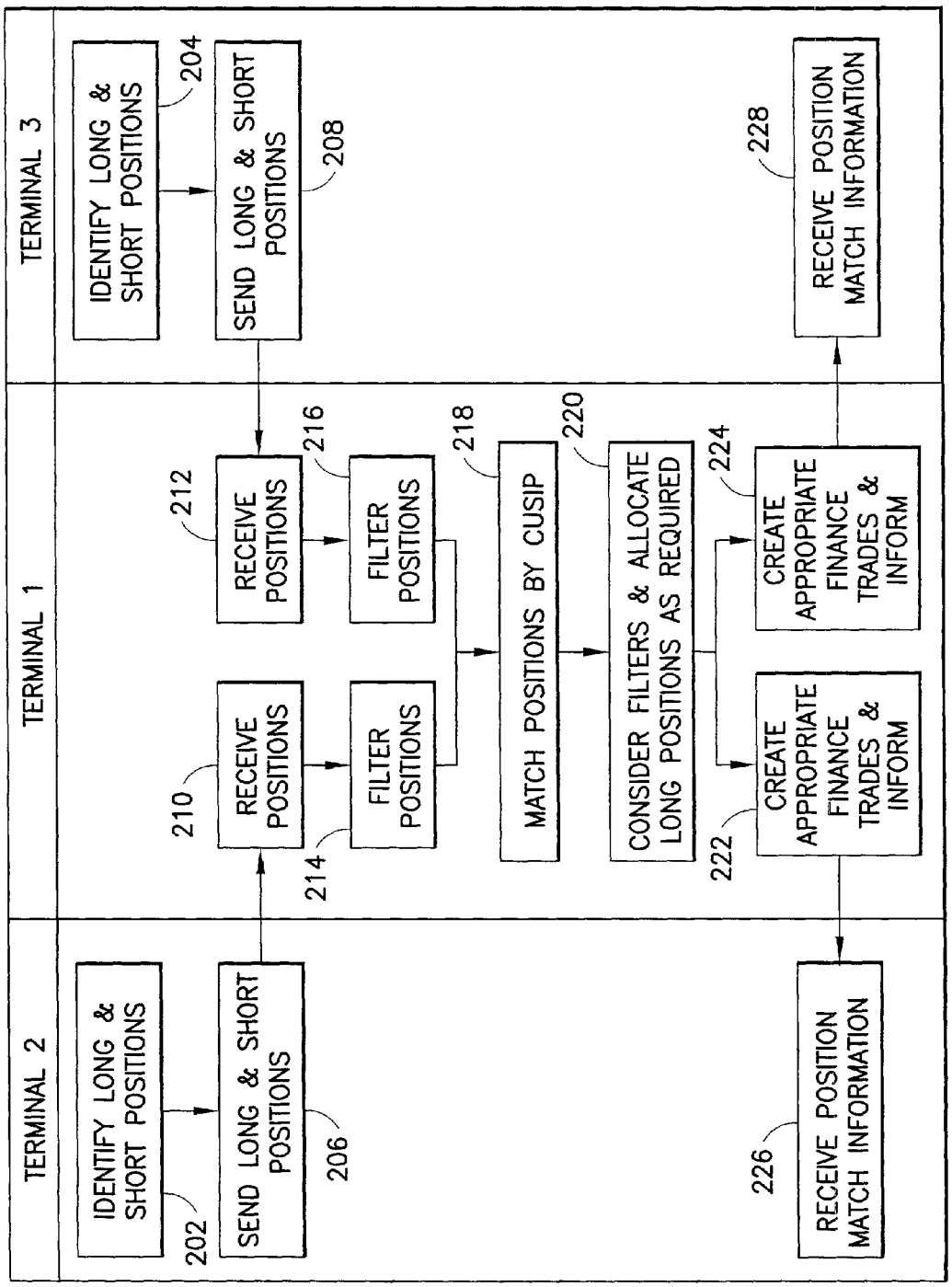
FIG. 2 illustrates an embodiment of steps in a method of the invention.

Referring to FIG. 2, one embodiment of the invention process flow begins at steps 202, 204, where members or participants at terminals 2 and 3 (represented in FIG. 1 by computers 102, 103, 104, 105) identify their long and short positions. As described above, in one embodiment, this occurs on a daily basis. In other embodiments, this occurs at intervals during the trading day.

At steps 206, 208, the members or participants each send the short and long positions that they identified to terminal 1 (represented in FIG. 1 by computer 106).

At steps 210, 212, terminal 1 receives the short and long positions from terminals 2 and 3. The respective positions are handled by terminal 1 in a manner such that they can be individually tracked or traced to the sending participant or member.

At steps 214, 216, terminal 1 filters the positions. This filtering is described generally above, and is according to the parameters that are established by the submitting member or participant. For example, one participant may require that their positions for a particular security be matched only with certain other participants. Or, they may require that the matching be according to certain allocation percentages. Or they may require that some percentage of their position not be matched.

At step 218, after the positions have been filtered, terminal 1 matches short positions with long positions. This matching occurs on a CUSIP basis until all positions that can be matched have been matched.

At step 220, terminal 1 considers any filters that have been established and allocates the long positions for each CUSIP to the short positions for that CUSIP. As discussed above, if there are more long positions than short positions, the lending is on a pro-rata basis. Alternatively, if there are more short positions than long positions, the borrowing is on a pro-rata basis.

Once the long and short positions have been matched and any allocation completed, then at steps 222, 224, terminal 1 creates the appropriate finance trades and informs terminals 2 and 3 of the trades.

Finally, at steps 226, 228, terminals 2 and 3 receive the position match information.

As illustrated in FIG. 2, filtering is performed by terminal 1. However, it is possible that terminals 2 and 3 perform some or all of the filtering before the positions are sent to terminal 1.

Figure 3:
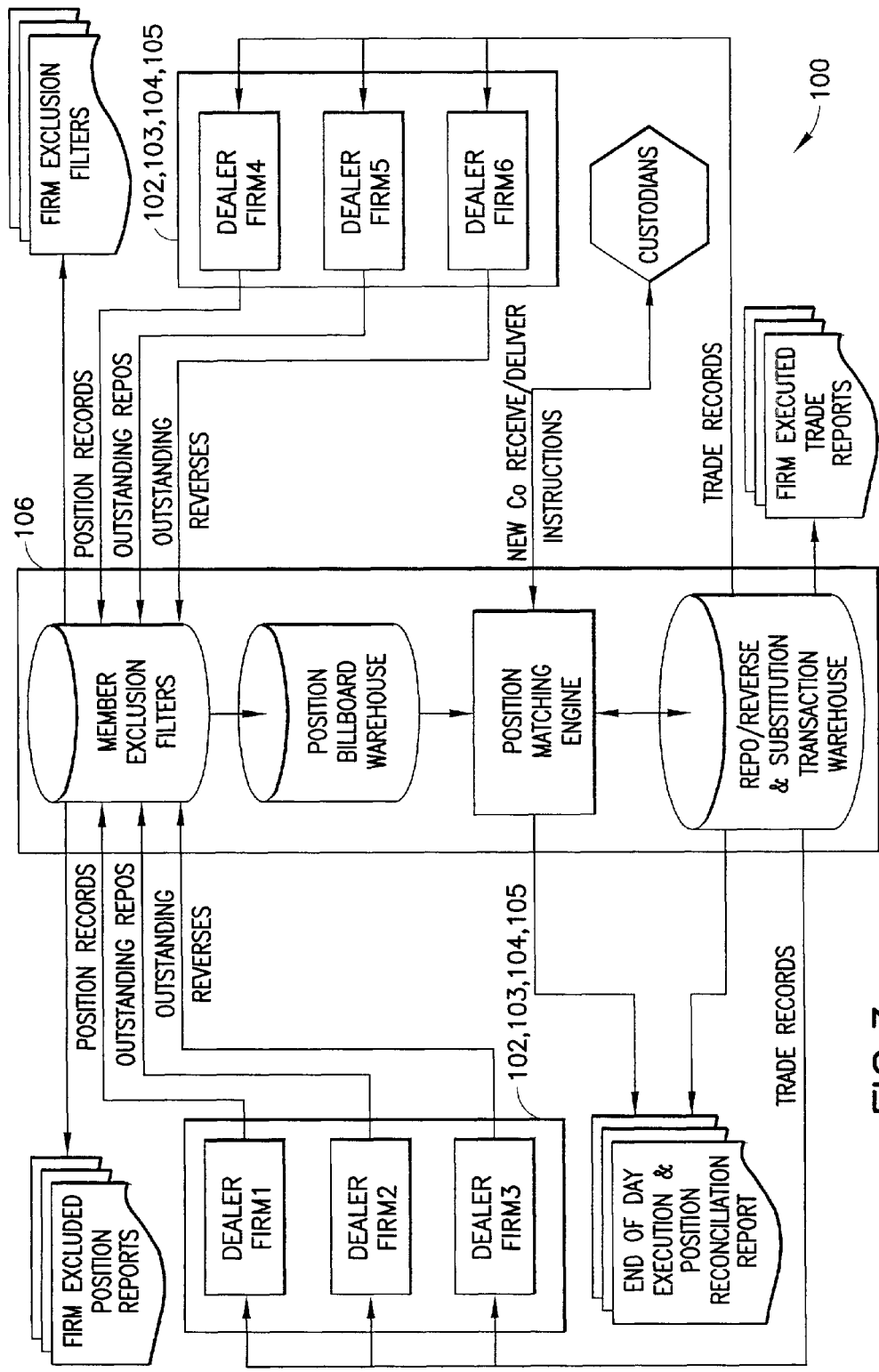
FIG. 3 illustrates an embodiment of a system and method according to one embodiment of the invention.

As illustrated in FIG. 3, the various elements of system 100 of the invention generally use an open-ended architecture to facilitate and expedite the exchange of information with its clients. Features provided include standardized message formats, instantaneous restart and recovery, real-time connectivity to clients and a global web-oriented network. In one embodiment, the invention operates within pre-scheduled processing cycles but is designed for real-time execution.

Anonymity among its clients is also a feature of some embodiments of the invention. Each member can view only their data and cannot gain access to other clients' data. Client access is achieved through rigorous sign-on security features such as encrypted sign-on IDs and passwords. Once a client successfully gains access to its own domain, the available functions are based upon the authorization level. Various authorization levels within client firms are established.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A processor-implemented method for automatically identifying a counter party position for a short or long position, the method comprising:
   receiving at a first terminal at least two member short positions;
   receiving at the first terminal at least two member long positions;
   identifying at the first terminal via a processor a selected short position from the at least two member short positions and a selected long position from the at least two member long positions, the selected short position and the selected long position having parameters associated with the positions; and
   executing via the processor the transaction between the selected member long position and the selected member short position based on the parameters associated with the positions;
   wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

2. A method according to claim 1, further comprising filtering the at least two short positions or the at least two long positions according to filter parameters.

3. A method according to claim 2, wherein the filter parameter is a percentage.

4. A method according to claim 2, wherein the filter parameter is a member identity.

5. A method according to claim 2, wherein the filter parameter is a limit on the number of counter parties.

6. A method according to claim 1, wherein identifying includes matching CUSIP information associated with the at least two short positions and CUSIP information associated with the at least two long positions.

7. A method according to claim 1, wherein the at least two short positions include short positions in different securities.

8. A medium storing computer executable instructions to perform a method for automatically identifying a counter party position for a short or long position, the method comprising:
   receiving at a first terminal at least two member short positions;
   receiving at the first terminal at least two member long positions;
   identifying at the first terminal a selected short position from the at least two member short positions and a selected long position from the at least two member long positions, the selected short position and the selected long position having parameters associated with the positions;
   executing the transaction between the selected member long position and the selected member short position based on the parameters associated with the positions;
   wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

9. A computer-readable medium having computer executable instructions stored thereon, the instructions for automatically identifying a counter party position for a short or long position, the instructions comprising:
   instructions to receive at a first terminal at least two member short positions;
   instructions to receive at the first terminal at least two member long positions;
   instructions to identify at the first terminal a selected short position from the at least two member short positions and a selected long position from the at least two member long positions, the selected short position and the selected long position having parameters associated with the positions; and
   instructions to execute the transaction as between members of a membership between the selected long position and the selected short position based on the parameters associated with the positions, wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

10. An apparatus for automatically identifying a counter party position for a short or long position, comprising:
a memory having at least one region for storing computer executable instructions, and
a processor for executing the instructions stored in the memory, wherein the instructions comprise:
instructions to receive at a first terminal at least two member short positions;
instructions to receive at the first terminal at least two member long positions;
instructions to identify at the first terminal a selected short position from the at least two member short positions and a selected long position from the at least two member long positions, the selected short position and the selected long position having parameters associated with the positions; and
instructions to execute the transaction as between members of a membership between the selected long position and the selected short position based on the parameters associated with the positions wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

11. A processor-implemented method for automatically identifying a counter party position for a short or long position, the method comprising:
receiving at a first terminal at least two member short positions for securities identified by CUSIP;
receiving at the first terminal at least two member long positions for securities identified by CUSIP;
filtering the at least two short positions or the at least two long positions according to filter parameters;
identifying at the first terminal via a processor a selected short position from the at least two member short positions and a selected long position from the at least two member long positions, the selected short position and the selected long position identified by comparing and matching the CUSIP of the respective selected short and long positions; and
executing via the processor the transaction between the selected member long position and the selected member short position based on the parameters associated with the positions;
wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

12. A processor-implemented method for automatically identifying a counter party position for a short or long position, the method comprising:
identifying via a processor at least two member short positions;
sending information on the at least two member short positions to a first terminal;
receiving information on the identified positions from the first terminal to allow a transaction between a selected short position and a selected long position, the selected short position one of the at least two member short positions, wherein the selected short position is identified from the at least two member short positions and the selected long position is identified from at least two member long positions by parameters associated with the positions, and information on the at least two member long positions is sent to the first terminal; and
executing via the processor the transaction between the selected member long position and the selected member short position based on the parameters associated with the positions;
wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

13. A processor-implemented method for automatically identifying a counter party position for a short or long position, the method comprising:
identifying via a processor at least two member long positions;
sending information on the at least two member long positions to a first terminal;
receiving information on the identified positions from the first terminal to allow a transaction between a selected long position and a selected short position, the selected long position one of the at least two member long positions, wherein the selected long position is identified from the at least two member long positions and the selected short position is identified from at least two member short positions by parameters associated with the positions, and information on the at least two member short positions is sent to the first terminal; and
executing via the processor the transaction between the selected long position and the selected short position based on the parameters associated with the positions;
wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

14. A processor-implemented method for automatically identifying a counter party position for a short or long position, the method comprising:
receiving at a first terminal at least two member short positions from one or more short position parties, wherein said short position parties have authorized a third party agent to act as a counterparty to each of said short position party's on-side transactions;
receiving at said first terminal at least two member long positions from one or more long position parties, wherein said long position parties have authorized said third party agent to act as a counterparty to each of said long position party's on-side transactions;
identifying at said first terminal via a processor a selected short position from said at least two member short positions and a selected long position from said at least two member long positions, said selected short position and said selected long position identified by parameters associated with said positions; and executing via the processor the transaction between the selected member long position and the selected member short position based on the parameters associated with the positions;

wherein the transaction includes a system-facilitated lending on a pro-rata basis between the selected positions if total selection member long position is greater than total selection member short position for a given financial instrument and borrowing on a pro-rata basis if total selection member short position is greater than total selection member long position for a given financial instrument.

15. A method according to claim 14, further comprising filtering said at least two short positions or said at least two long positions according to filter parameters.

16. A method according to claim 15, wherein said filter parameter is a percentage.

17. A method according to claim 15, wherein said filter parameter is a member identity.

18. A method according to claim 15, wherein said filter parameter is a limit on the number of counter parties and wherein said at least two short positions include short positions in different securities.

19. A method according to claim 14, wherein identifying includes matching CUSIP information associated with said at least two short positions and CUSIP information associated with said at least two long positions.

20. A method according to claim 1, wherein the first terminal acts as a third party participant and provides anonymity of members.

21. A method according to claim 15, wherein the filtering parameters are specified by a member.

* * * * *